May 25, 1926.
H. S. JOHNSON
1,586,448
SAFETY DEVICE FOR LOCOMOTIVE TRUCKS
Filed Jan. 7, 1926    2 Sheets-Sheet 1
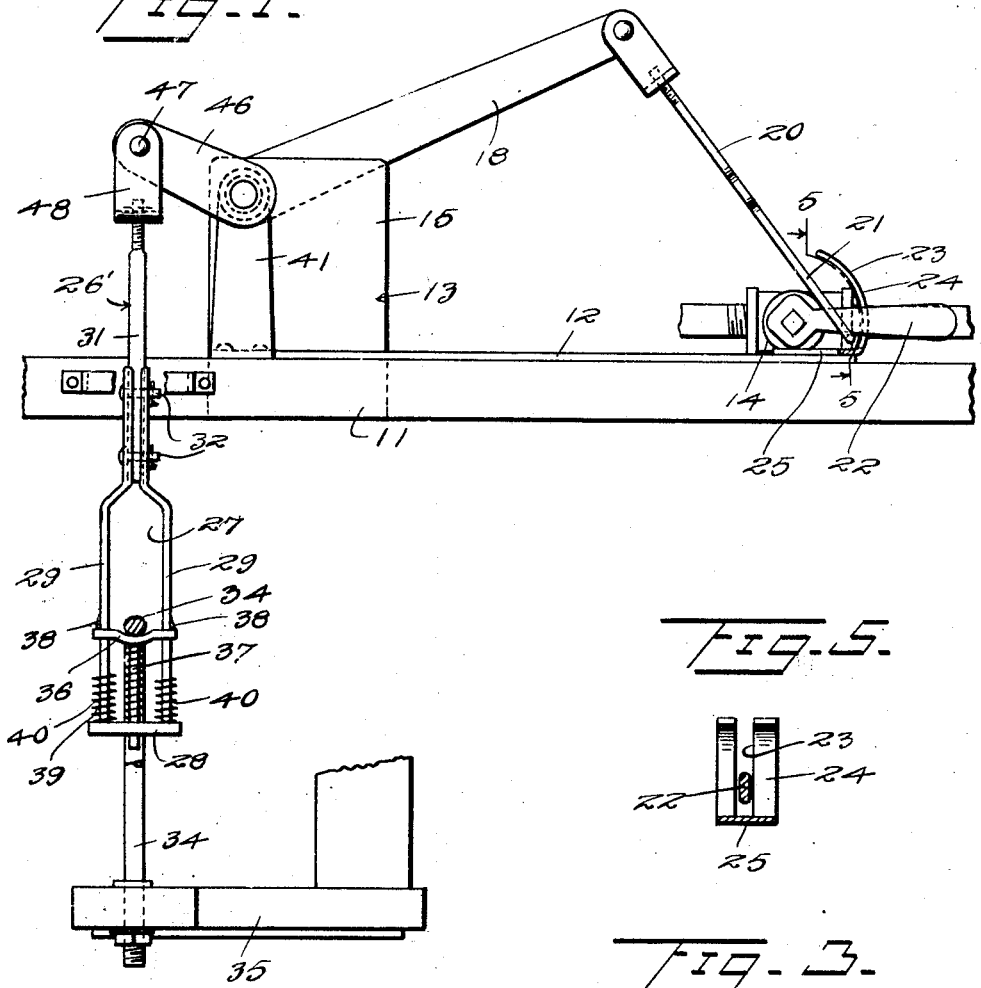
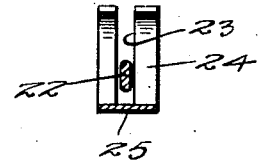
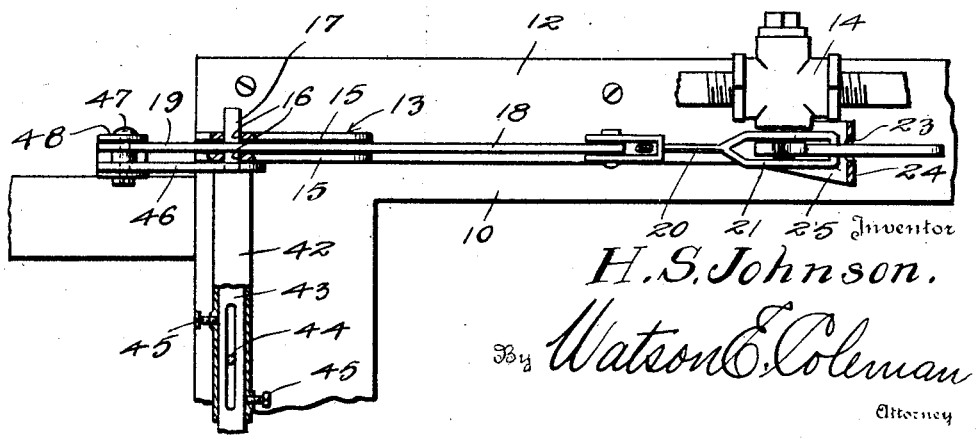
Inventor
H. S. Johnson.
By Watson E. Coleman
Attorney May 25, 1926.
H. S. JOHNSON
SAFETY DEVICE FOR LOCOMOTIVE TRUCKS
Filed Jan. 7, 1926     2 Sheets-Sheet 2
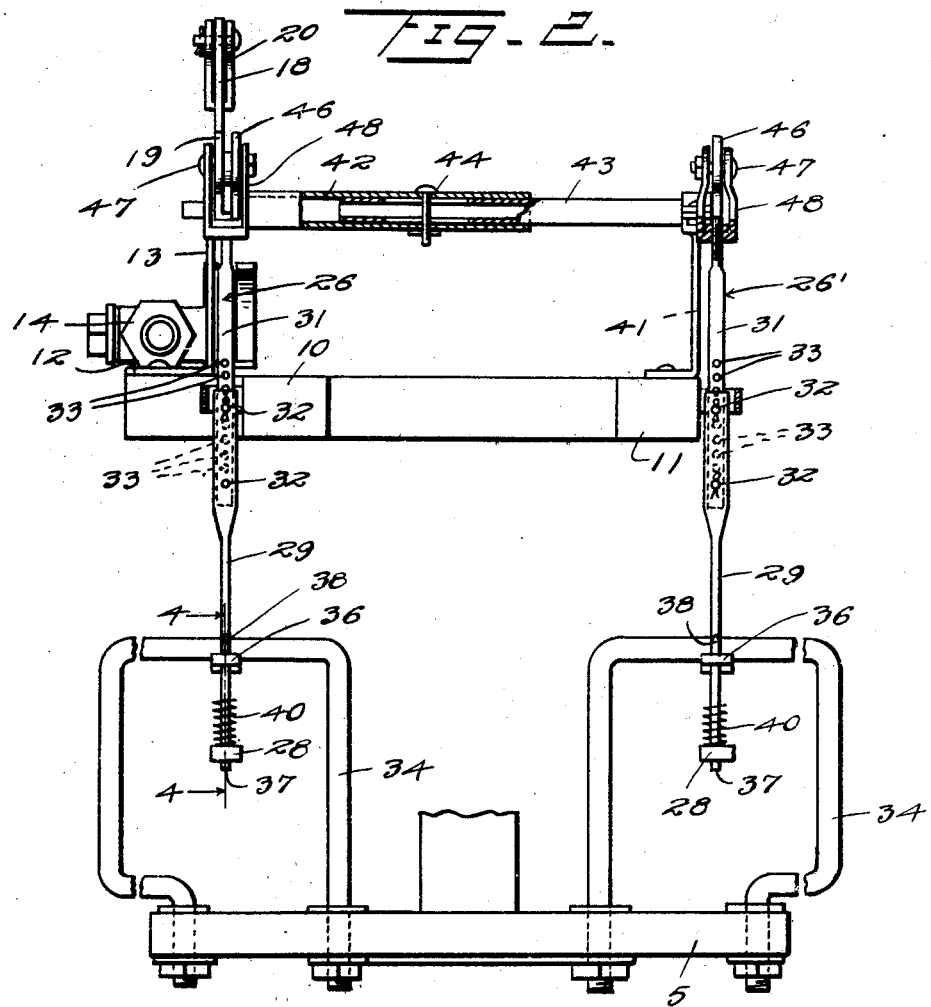
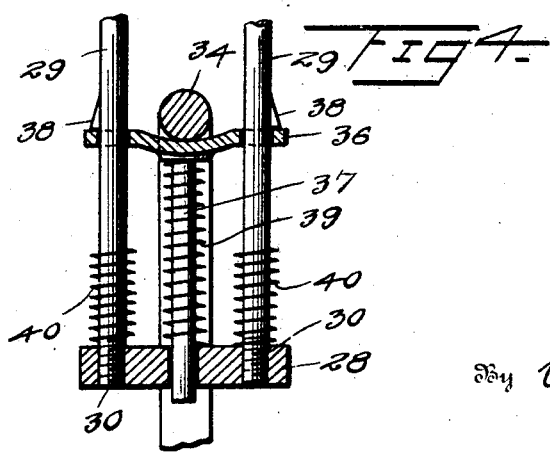
Inventor
H. S. Johnson.

Patented May 25, 1926.

1,586,448

UNITED STATES PATENT OFFICE.

HARLEY S. JOHNSON, OF ERWIN, TENNESSEE.

SAFETY DEVICE FOR LOCOMOTIVE TRUCKS.

Application filed January 7, 1926. Serial No. 79,908.

This invention relates to safety devices for locomotive trucks and more particularly to a device for opening a cock to stop the locomotive or indicate derailment of the pony truck of the locomotive.

As is well known in certain types of locomotives, due to their immense size, it is practically impossible for an engineer in his cab to determine whether the pony truck has left the rails or not. Derailment of the pony truck of a locomotive merely results in the weight formerly carried by the pony truck being transferred to the drivers of the locomotive. Therefore, it is a frequent occurrence that the pony truck will leave the rails and after the locomotive has traveled a considerable distance, finally strike some obstruction, causing the truck to assume a position where it will derail the locomotive.

In my prior Patent, No. 1,556,839, granted October 13, 1925, I have disclosed a similar apparatus for use with pony trucks of locomotives, but this apparatus is faulty in that it allows too much strain to be applied to certain of the working parts with the result that when the device is operated by derailment of a truck, these working parts are damaged or destroyed, in that it only operates if the side of the truck at which the device is connected is arranged, becomes derailed and in that it leaves to the shop mechanics the making of more or less delicate adjustments with the result that the device often either fails to operate or operates improperly and without the pony truck leaving the rails. It is to be understood that due to the fact that drivers of a locomotive assume the weight of the locomotive when the pony truck leaves the rails or lowers from any other cause, there is a constantly changing distance between any fixed point upon the frame of the locomotive and a fixed point upon the pony truck. Under ordinary circumstances, this play is about one and five-eighths inches and since it is desired that a warning be given or the train stopped in event there is a broken rail head as well as in cases of derailment, it will be understood that the device must be more or less delicate in its operation when the size of the mechanism with which it is associated is considered. Accordingly, an important object of this invention is to provide a device of this character in which a single structure may be adjusted to fit any size of locomotive, is readily applied to the locomotive and provides a gauge, rendering its application, in so far as connections to the pony truck are concerned, a very simple matter.

These and other objects I attain by the construction shown in the accompanying drawings, wherein for the purpose of illustration is shown a preferred embodiment of my invention and wherein:—

Figure 1 is a side elevation partially in section showing a safety device constructed in accordance with my invention;

Figure 2 is an end elevation thereof partially in section;

Figure 3 is a fragmentary plan likewise partially in section;

Figure 4 is an enlarged detail view showing the construction of the eye permitting normal play and taken on the line 4—4 of Figure 2 between the pony and locomotive trucks;

Figure 5 is a section on the line 5—5 of Figure 1.

Referring now more particularly to the drawings, the numerals 10 and 11 indicate longitudinally extending frame members of a locomotive upon one of which above the pony truck I mount a plate 12. In the present instance, this plate 12 is shown as applied to the left-hand side member 10 of the locomotive and forms the mounting for a casting 13 and the cock 14. The casting 13 embodies spaced side arms or plates 15 extending longitudinally of the locomotive frame and having aligned openings 16 for the reception of a pivot element 17 upon which intermediate the plates is mounted a lever having a long arm 18 and a short arm 19. The long arm 18 extends over the cock 14 and pivotally connected to its free end is a link 20, the lower end of which is in the form of an elongated eye 21 receiving in the opening thereof the handle 22 of the cock. This cock handle extends through a slot 23 formed in an arcuate extension 24 of a plate 25 welded or otherwise secured to the plate 12. The arcuate extension acts as a keeper, preventing the eye 21 from disengaging from the cock handle until the cock handle is at the upper limit of its movement or at that limit of its movement where the cock is fully opened. Thus, if the eye is engaged over the cock handle and the cock handle forced to its closed position, it will be apparent that the eye may not escape but since this handle works through ninety degrees and the arcuate extension is of less magnitude than ninety degrees, when the handle is at its open position, the eye may slide therefrom. This permits complete disconnection of the cock and lever so that no strain will be placed upon the cock, even though the eye 21 is moved through a greater distance than the cock handle may move. The length of opening of the eye is such that the cock handle may, however, be freely moved to its open position for testing purposes without disturbing the link.

The short arm 19 of the lever has secured thereto a depending link 26, the lower end of which is formed as an elongated eye 27 which is variable as to its effective length, in a manner more particularly described hereinafter. The link 26 is made adjustable as to length and this is preferably accomplished by forming the eye in a base section 28 and side sections 29 which are threaded into the base section, as at 30, at their lower ends and at their upper ends engage the lower end of the upper section 31 of the link 26 and are secured thereto by securing elements 32. The securing elements pass through openings 33 formed in the link section 31 and a plurality of these openings are provided, so that the device may be vertically adjusted to compensate for differences in distance between the frame of the locomotive and the member 34 carried by the pony truck frame 35 of the locomotive and with which they are associated.

The member 34 is in the form of an eye elongated transversely of the locomotive and this eye engages a false bottom 36 of the eye 27. The false bottom 36 is in the form of a plate slidably engaging the lower ends of the side members 29 which are rounded and having a stem 37 slidably directed through an opening formed in the bottom 28 of the eye. The side members have exteriorly disposed shoulders 38 limiting upward movement of the false bottom and between the false bottom and the bottom 28 a spring 39 surrounds the stem 37 and constantly urges the false bottom upwardly. These lugs must be located upon the outer surfaces of the side members 29 in order that the interior of the eye may have a smooth finish and provide no surface against which the member 34 may engage to cause accidental operation of the lever and actuation of the cock 14. The false bottom may partake of a downward movement of approximately one and five-eighths inches and this amount of movement is sufficient to compensate for normal movements of the pony truck so that with the pony truck in position upon a level track, such as is afforded in a round-house where the devices will be applied, it is simply necessary to adjust the links 26 until the false bottom comes into actual contact with the under surface of the eye. The false bottom is kept in constant engagement with the eye 34 during movements of the pony truck and only reaches its lowermost position when the pony truck actually leaves the rails. It will be obvious that when the pony truck does leave the rails, there will be considerable strain placed upon this arm and as the shock applied is liable to be a very sudden one, I preferably place upon the arms 29 beneath the false bottom 36 additional springs 40 which only come into play immediately before the false bottom reaches the lower limit of its movement and serve to cushion the shock which would otherwise be imparted to all the portions of the mechanism.

The mechanism just described is applicable to one side of the locomotive and will only affect an opening of the cock 14 when the corresponding side of the pony truck becomes derailed. In order that the valve may be operated immediately upon derailment of either side of the pony truck or upon temporary dropping thereof, due to a broken rail head or the like, I provide upon the opposite side frame member 11 of the locomotive a bearing 41. The pivot 17 is formed upon one end of one section 42 of a telescopic shaft 43, the ends of which are preferably held against rotation by a pin and slot engagement, as at 44 and the sections of which are held against longitudinal movement when in adjusted position by setscrews 45 or the like.

Each of the sections 42 and 43 is provided with a crank arm 46, the crank arm 46 of the section 42 being arranged immediately adjacent the side of the casing 13 and being connected to the short arm 19 of the lever by the clevis bolt 47 of the clevis 48 of the link 26. The opposite crank arm 46 occupies a corresponding position at the opposite side of the locomotive and has attached thereto a link 26' corresponding exactly in structure with the link 26, hereinbefore described.

It will be obvious that a pull through a sufficient distance upon either of the links 26 or 26' will cause an operation of the lever and opening of the cock. It will be obvious that since the link 20 engages the cock handle 22 immediately adjacent its inner end, but a very small movement is necessary to cause a full operation of the cock and accordingly the cock will be open if the locomotive truck drops at either side as the result of a broken rail head. It will also be obvious that in event of derailment and consequent operation, if any breakage occur to any of the parts at one side of the locomotive only, it will be quite easy to replace the pivot 17 with an ordinary bolt so that the locomotive may at least be partially safe-guarded during its continued operation.

Since the construction hereinbefore set forth is obviously capable of a certain range of change and modification without materially departing from the spirit of the invention, I do not limit myself to such specific structure except as hereinafter claimed.

I claim:—

1. In a safety device for indicating derailment of locomotive trucks and the like, a lever pivoted intermediate its ends upon the main frame of the locomotive, a connection between one end of the lever and the locomotive truck permitting limited transverse and vertical movement of the truck without imparting such movements to the lever, a cock having the usual handle, a link pivotally connected with the opposite end of the lever and having at its free end an elongated eye receiving the handle of the cock and a member associated with the cock preventing disengagement of the eye of the link from the cock handle until the cock handle is in the fully open position and permitting disengagement when the cock is in fully open position.

2. In a safety device for indicating derailment of locomotive trucks and the like, a lever pivoted intermediate its ends upon the main frame of the locomotive, a connection between one end of the lever and the locomotive truck permitting limited transverse and vertical movement of the truck without imparting such movement to the lever, a cock having the usual handle, a link pivotally connected with the opposite end of the lever and having at its free end an elongated eye receiving the handle of the cock and a member associated with the cock preventing disengagement of the eye of the link from the cock handle until the cock handle is in the fully open position and permitting disengagement when the cock is in fully open position comprising an arcuate plate having a slot in which the cock of the handle engages until the cock handle arrives at the fully open position.

3. In a safety device for indicating derailment of locomotive trucks and the like, a lever pivoted intermediate its ends upon the main frame of the locomotive, a connection between one end of the lever and the locomotive truck permitting limited transverse and vertical movement of the truck without imparting such movements to the lever, a cock having the usual handle, a link pivotally connected with the opposite end of the lever and having at its free end an elongated eye receiving the handle of the cock and a member associated with the cock preventing disengagement of the eye of the link from the cock handle until the cock handle is in the fully open position and permitting disengagement when the cock is in fully open position, said eye being of a length permitting movement of the cock handle to fully open position without disturbing said link.

4. In a safety device for indicating derailment of locomotive trucks and the like, a lever pivoted intermediate its ends upon the main frame of the locomotive, a connection between one end of the lever and the locomotive truck permitting limited transverse and vertical movement of the truck without imparting such movements to the lever including an eye carried by and elongated transversely of the locomotive truck, a link having a vertically elongated eye at its lower end and connected at its upper end to the lever, a false bottom for said link, means yieldably forcing the false bottom upwardly, means limiting the upward movement of the false bottom, said false bottom constantly engaging the eye of the truck during all relative movements of the truck and locomotive and a cock connected with the opposite end of the lever.

5. In a safety device for indicating derailment of locomotive trucks and the like, a lever pivoted intermediate its ends upon the main frame of the locomotive, a connection between one end of the lever and the locomotive truck permitting limited transverse and vertical movement of the truck without imparting such movements to the lever including an eye carried by and elongated transversely of the locomotive truck, a link having a vertically elongated eye at its lower end and connected at its upper end to the lever, a false bottom for said link, means yieldably forcing the false bottom upwardly, means limiting the upward movement of the false bottom, said false bottom constantly engaging the eye of the truck during all relative movements of the truck and locomotive and a cock connected with the opposite end of the lever, the connection between the cock and lever completely disengaging from the lever when the cock is fully open.

6. In a safety device for indicating derailment of locomotive trucks and the like, a lever pivoted intermediate its ends upon the main frame of the locomotive, a connection between one end of the lever and the locomotive truck permitting limited transverse and vertical movement of the truck without imparting such movements to the lever including an eye carried by and elongated transversely of the locomotive truck, a link having a vertically elongated eye at its lower end and connected at its upper end to the lever, a false bottom for said link, means yieldably forcing the false bottom upwardly, means limiting the upward movement of the false bottom, said false bottom constantly engaging the eye of the truck during all relative movements of the truck and locomotive and a cock connected with the opposite end of the lever, the connection between the cock and lever completely disengaging from the lever when the cock is fully open and permitting opening of the cock without disturbing the connection while the lever is in its normal position.

7. In a safety device for indicating derailment of locomotive trucks and the like, a shaft extending transversely of the locomotive and mounted upon the locomotive frame for rocking movement, a lever mounted upon one end of the shaft and connected thereto for movement therewith, a cock, a connection between one end of the lever and the cock, a connection between the opposite end of the lever and the locomotive truck, an arm upon the opposite end of the shaft and a connection between said arm and the corresponding side of the locomotive truck.

8. In a safety device for indicating derailment of locomotive trucks and the like, a shaft extending transversely of the locomotive and mounted upon the locomotive frame for rocking movement, a lever mounted upon one end of the shaft and connected thereto for movement therewith, a cock, a connection between one end of the lever and the cock, a connection between the opposite end of the lever and the locomotive truck, an arm upon the opposite end of the shaft, a connection between said arm and the corresponding side of the locomotive truck, said connections each including a member carried by and extending transversely of the locomotive truck and a member constantly engaged therewith during normal movements of the locomotive truck without transmitting such normal movements to the shaft or lever.

9. In a safety device for indicating derailment of locomotive trucks and the like, a shaft extending transversely of the locomotive and mounted upon the locomotive frame for rocking movement, a lever mounted upon one end of the shaft and connected thereto for movement therewith, a cock, a connection between one end of the lever and the cock, a connection between the opposite end of the lever and the locomotive truck, an arm upon the opposite end of the shaft and a connection between said arm and the corresponding side of the locomotive truck, the connection between the lever and shaft including a pivot carried by the shaft and upon which the lever is mounted, an arm carried by the shaft and extending adjacent one end of the lever, the connection between the lever and the truck frame including a clevis embracing said arm and the adjacent end of the lever.

In testimony whereof I hereunto affix my signature.

HARLEY S. JOHNSON.